June 1, 1937.   C. STRAW ET AL   2,082,365
BOX MAKING MACHINE
Filed Oct. 31, 1935   7 Sheets-Sheet 1

INVENTORS
Clayton Straw,
Charles H. George,
BY
Robert K. Randall,
ATTORNEY.

June 1, 1937.  C. STRAW ET AL  2,082,365
BOX MAKING MACHINE
Filed Oct. 31, 1935  7 Sheets-Sheet 4

INVENTORS.
Clayton Straw,
Charles H. George,
BY
Robert K. Randall,
ATTORNEY.

June 1, 1937. C. STRAW ET AL 2,082,365
BOX MAKING MACHINE
Filed Oct. 31, 1935 7 Sheets-Sheet 7

INVENTORS.
Clayton Straw,
Charles H. George,
BY
Robert K. Randall
ATTORNEY.

Patented June 1, 1937

2,082,365

UNITED STATES PATENT OFFICE 2,082,365

BOX MAKING MACHINE

Clayton Straw, Henniker, and Charles H. George, Contoocook, N. H., assignors to Kingsbury & Davis Machine Company, Contoocook, N. H., a corporation of New Hampshire Application October 31, 1935, Serial No. 47,644

20 Claims. (Cl. 93—51)

The invention relates in general to automatic box making machines, and in particular to such machines for the manufacture of the type of paper, cardboard, or equivalent boxes in which the ends are formed by bending endwise extensions of the bottom of the box up and over tabs formed on the sides of the box after such tabs have been bent at right angles to the sides into a common plane, and thereafter folding the top portions of the extensions down inside the box against the tabs and securing the parts in this relation.

The objects of the present invention include among others the provision of improved, simpler, and more effective and reliable devices for folding a flat blank into a finished box: specifically, for bending up the sides, for bending the tabs on the sides into the planes of the ends, for bending up the extensions on the bottom of the box to form the outside portions of the ends, and for folding the free ends of these extensions down within the box; additionally, the invention aims to provide improved means for removing the finished box from the machine. To attain these aims, the invention includes automatically operating mechanism for turning up the sides and ends, and for turning in the tabs on the side portions of the box blank, preferably simultaneously with the folding-up of the side portions of the blank into the right-angle relation they are to have in the finished box. It further provides automatically operating devices for folding the extension on the bottom of the box over the top edges of these tabs and down inside the box, and for supporting the tabs and the portion of the bottom extension which is to remain at the outside of the box rigidly in position during this folding operation so that this fold-line will be properly formed and neat and true and the top edges of the ends of the box thus will be matched and coordinated with the top edges of the sides. Also, mechanically operated devices are provided to engage and remove the box from the machine.

The invention is represented in the accompanying drawings as embodied in a machine of well-known character and construction; but it should be understood that, so far as the construction of the machine in general is concerned, it is not material to the invention and may be varied in practice according to the exigencies of use and the views of machine builders and users.

In the drawings,—

Fig. 16 is an elevation of certain of the parts of Fig. 15 in the relations occupied thereby as the folding is completed.

The invention is illustrated in conjunction with the well-known Kingsbury & Davis Paper box machine of U. S. Letters Patent No. 655,434, patented Aug. 7, 1900, and No. 728,086, patented May 12, 1903, to which documents reference can be had for an understanding of the operation of all parts not specifically described herein.

Figures 1, 3:
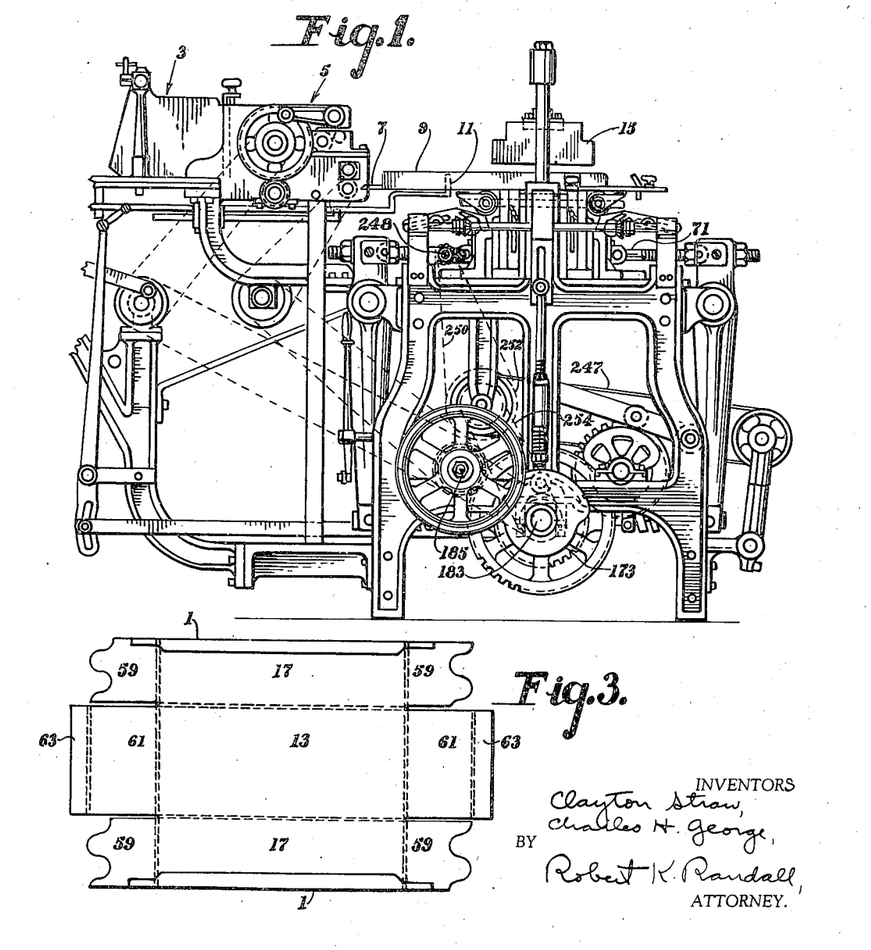
Fig. 1 shows the said machine in side elevation, and Fig. 2 in plan, with the devices of the invention applied thereto.
Fig. 3 shows the blank used by the machine.

In the operation of this machine, the blanks which have been previously cut and creased or scored into the shape shown in Fig. 3, and with portions along their side-edges 1 previously folded over as shown there, are stacked up in the hopper 3 and fed automatically one by one through the paster 5, applying paste to the upper surface of portions 61 and 63 of the blank, and out on to the guide-rails 7 between the side-guides 9 which engage the folded side-edges 1 of the blank. The pusher 11 then pushes the blank along the guide-rails 7 until the portion 13 forming the bottom of the box is beneath and in register with the form 15.

Figures 2, 16:
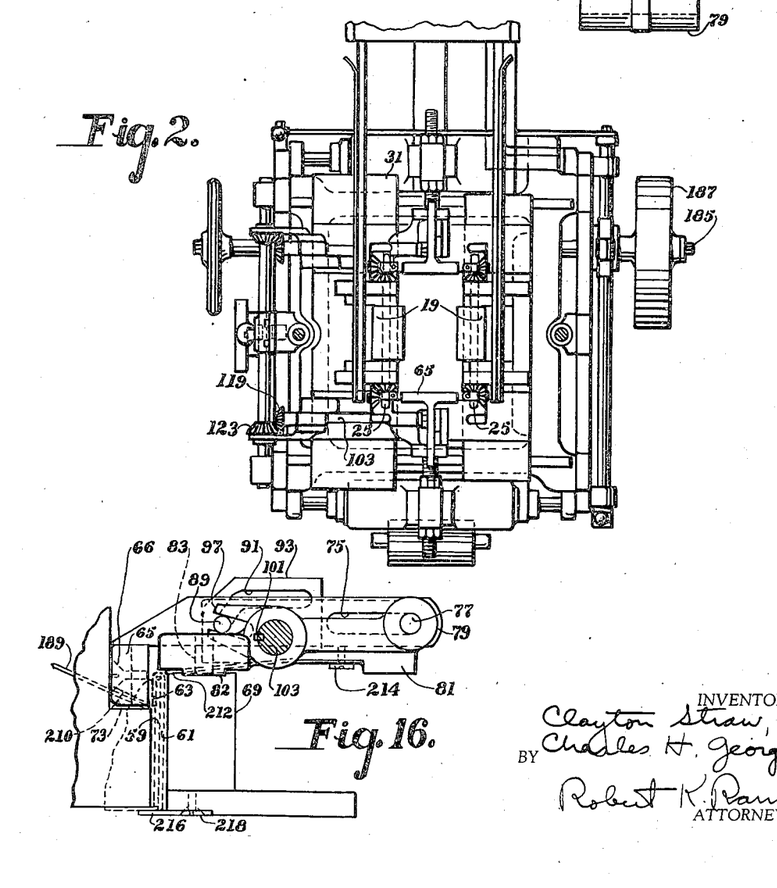

In accordance with the invention, novel means are provided for bending up the sides 17 of the blank into right angle relation with the plane of the bottom 13, to form the sides of the box. Such means comprise plates 19, Figs. 2, 5, 6 and 7–13, extending for a substantial portion of the length of each side as indicated in Fig. 2, and fixed by means of hubs 21 and set screws 23 upon rockshafts 25 rotating in the upper ends of side-folding stands 27 fixed by bolts 29, Fig. 15, to the main table 31 of the machine.

The inward edge of each plate 19 is rounded off to form a bead 33, Figs. 6 to 9, which extends into the path of the form 15. In its normal horizontal waiting position of Figs. 7 and 9, each plate 19 is located slightly below the guide-rails 7 and thus beneath a blank resting thereon. When the form 15 descends, the under surface of portion 13 of the blank, backed up by the solid portions of the form, encounters the two beads 33 just inside the creased or scored line defining the sides 17 from the bottom 13, rotating plates 19 from the full-line position of Figs. 7 and 9 to the full-line position shown in Fig. 8 and the dotted-line position of Fig. 9. This causes the plane upper portion of plates 19 to bend the side portions 17 of the blank into close conformity with the vertical side portions of the form 15. The side-folding stands 27 may aid in effecting the folding by means of their curved surfaces 28 in usual manner, if desired. During this turning up of the sides 17, there is no appreciable relative motion between the outer surfaces of the sides and the respective plates 19; in addition, the plate is recessed throughout its length just above the bead 33, as indicated at 35, with that portion of the curve 35 that is adjacent plate 19 concentric with shaft 25, which permits the side to be brought into vertical relation, with little or no contact with the fold line. The use of these swinging side-bending plates obviates all tendency for the form to shear through the blank as often occurs when the sides thereof have to be bent wholly by contact with bending bars or other elements which are fixed and thus have relative motion with respect to the material of the sides during the critical moment at the beginning of the bending, as also when the material is very stiff; the bending-up is effected mechanically, instead of through relying on the stiffness of the material, and the time available for getting the sides turned up is materially increased, both of which features greatly reduce the strain on the box material.

On the opposite ends of each shaft 25 is clamped a collar 37, Figs. 5 to 8 and 12, slotted and provided with a clamping screw 39, and carrying a stud 41 on which is rotatably mounted and retained by nut 43 and washer 45 a bevel gear 47 equipped with teeth over a part of its bevelled face which mesh with a correspondingly constructed bevel gear 49 surrounding shaft 25 and fixed non-rotatably to the side-folding stands 27 by means of pins 51. On the rotating bevel gear 47 an arm 53 is fixed by means of pin 55 so as to rotate always with gear 47; the extremity of the arm is bent at right angles to the plane of rotation of bevel gear 47 to form the part 57 which acts as a folding finger upon the corresponding one of the four tabs 59 of the blank.

Figure 6:
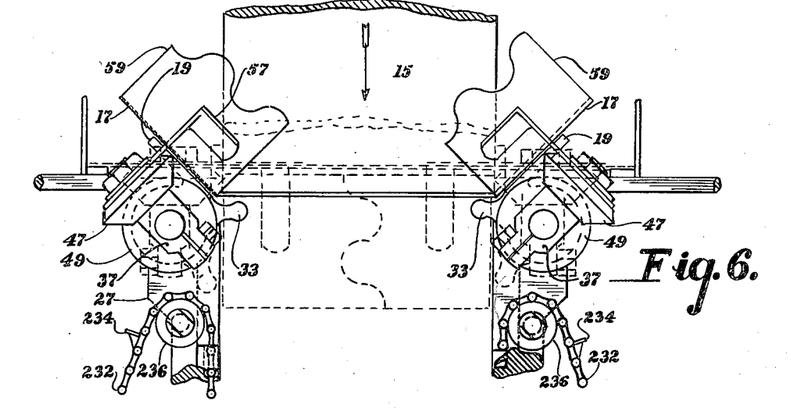
Fig. 6 shows in elevation the side and tab folders in action upon a blank.
Figures 7, 8, 9, 10, 11, 12, 13:
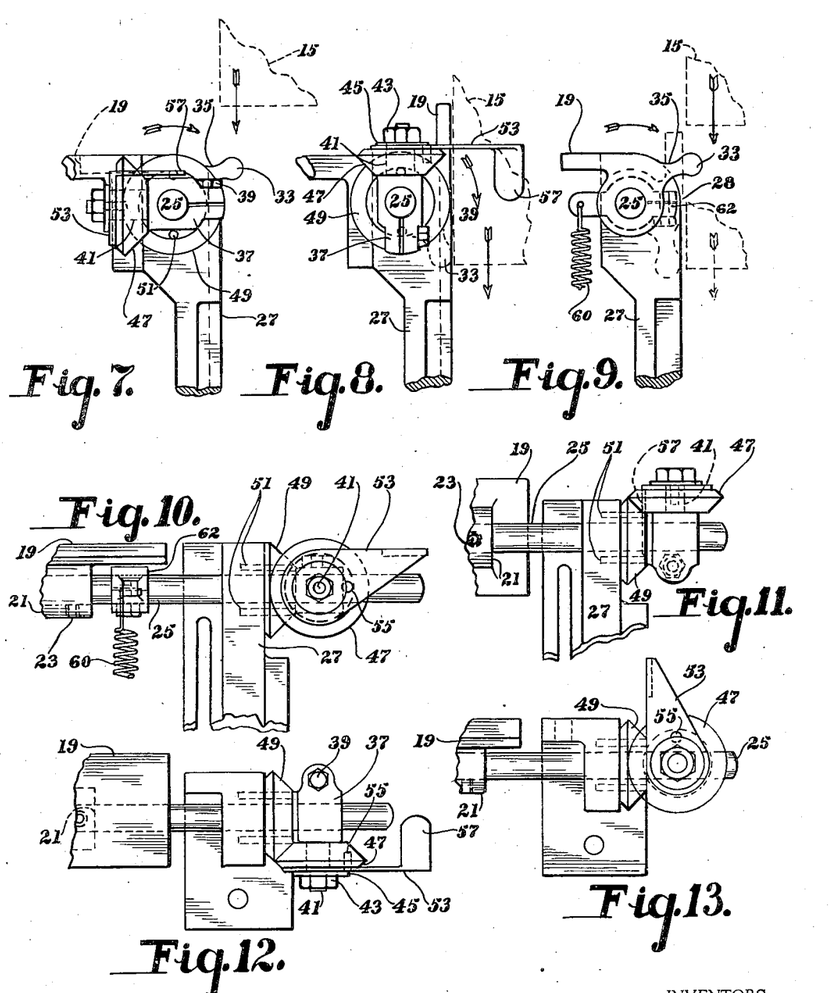
Figs. 7 to 13 are detail views showing the construction and operation of the side folders and tab folders.

When the form 15 strikes the bead 33 and rocks rockshaft 25, the stud 41 on collar 37 is likewise swung through a quarter turn about shaft 25, rolling gear 47 around fixed gear 49 and thus causing the finger 57 to swing from its waiting position of Figs. 7, 10 and 12, upward, inward and downward in a helical path through the position shown in Fig. 6 into that shown in Figs. 8, 11 and 13. This action of the four folding fingers 57 folds the two tabs 59 at each end of the box inwardly until in a common plane and against the ends of form 15; during this entire folding of the tabs, the fingers 57 have engaged and followed along with the outer surfaces of the tabs with little or no appreciable relative motion with respect thereto. The folding of the tabs is thus accomplished simultaneously with the turning up of the sides of the box, and in unvarying timing since actuated wholly through the downward stroke of the form 15. The folding fingers 57, like the side-folders 19, thus act during a relatively long period of time, and hence without injury to the material.

The sides of the form are carried up high enough to prevent the bead 33 from getting above the form. Suitable retractor springs 60 attached to clamp collars 62 adjustably fixed on the rockshafts 25 of the two side folding plates 19 restore these plates and the folding fingers 57 to their waiting position of Figs. 7, 10 and 12 as soon as the form 15 rises.

Figure 4:
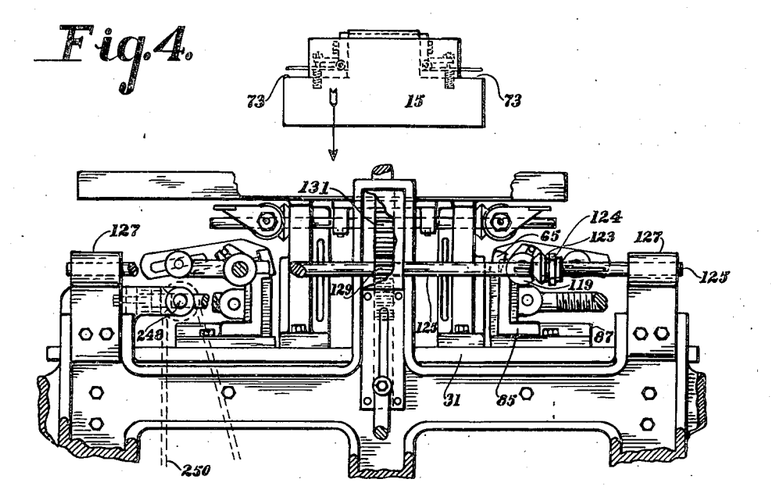
Figs. 4 and 5 are respectively side and end elevations of the box machine, with all parts except those immediately concerned with the shaping of the box removed.
Figure 14:
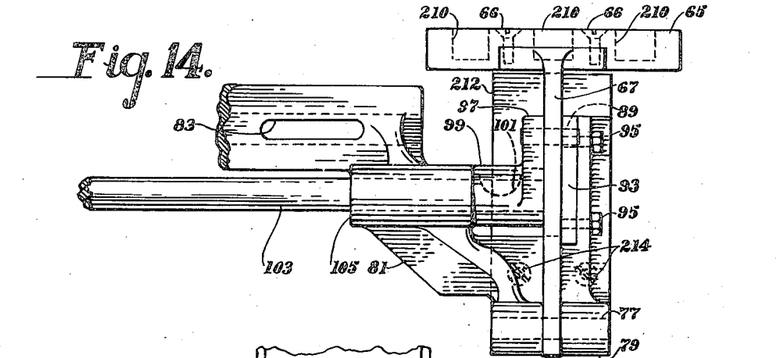
Fig. 14 is a plan view of the end-folding unit.
Figure 15:
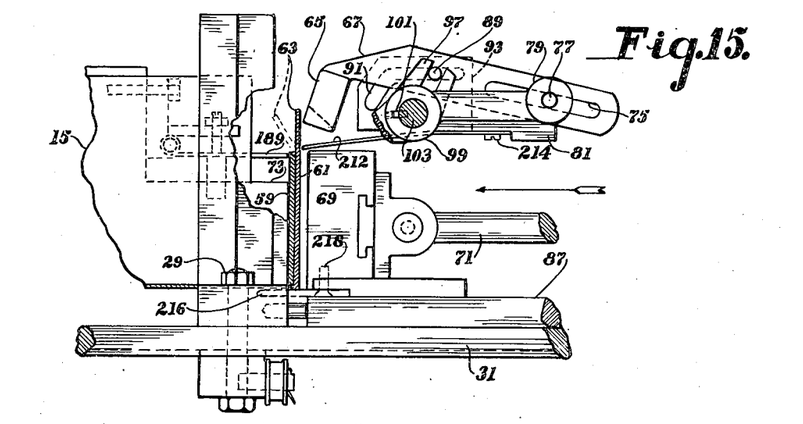
Fig. 15 is a side elevation of the same showing its operative relation to the other parts cooperating in the folding of the end down inside the box.

For turning up the portions 61 of the blank to form the outside parts of the box-end, and for carrying the extremity 63 of each end inwardly over the top edges of the tabs 59 and down within the box, end-folding members 65, Figs. 4, 14, and 15, are provided at a level far enough below the side-folding and tab-folding elements so that the functions of these latter parts shall have been completed before the ends are turned up. Immediately upon their completion, the continued descent of the form brings the flaps 61, 63, on the ends of the bottom of the box blank into contact with the rounded top edge of the horizontal member 65 and with the adjacent portions of the shank 67 of the latter, which turns these end portions up into substantially the relation shown in Fig. 15, while the presser 69 at each end of the box is approaching the ends thereof, being driven inward by its link 71 in the usual manner of the machine of the aforesaid patent.

Thereupon the member 65 is actuated to travel first inwardly from its position of Fig. 15 and then downwardly within the box into the position shown in Fig. 16, thereby bending over the upstanding portion 63 and folding it over the top edges of the two tabs 59 and into contact with the interior surfaces of the latter, whereupon the presser 69 completes its inward stroke to press the pasted areas of the surfaces of portions 61 and 63 in contact with the tabs into firm adhesion therewith.

Since the form 15 is cut away at 73 to admit the end-folding member 65, part of the pressure of the presser 69 upon the end of the box is resisted by the form 15 and part by the outward surface of the end-folder 65.

Figure 5:
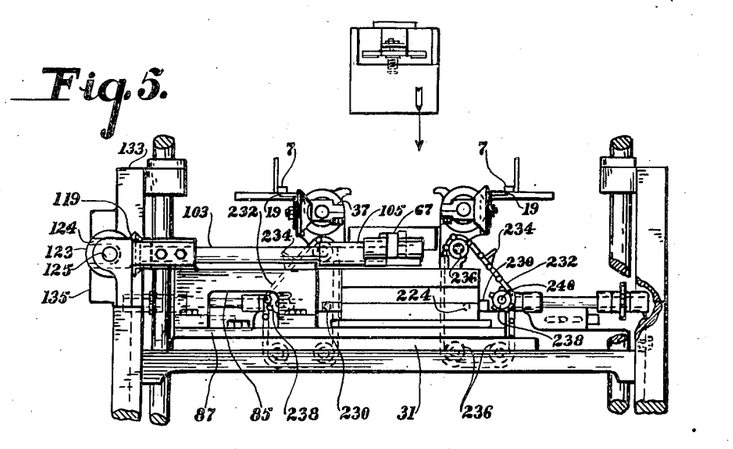
Figure 19:
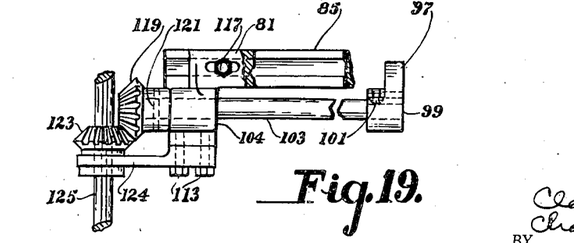
Fig. 19 is a plan view of a portion of the drive means for the end folder, showing the adjustment to suit the size of the box being made.

To give the end-folder its desired movement, the shank 67, which is fixed to the end-folder 65 by screws 66, has a slot 75, Fig. 15, through which extends a guide-pin 77, Figs. 14 and 15, fixed in hub 79 on bracket 81, splined at 82, Fig. 16, which bracket is in turn fixed by means of its slot 83, a bolt 117 passing therethrough, and its spline 82, to a supporting bracket 85, Fig. 5, bolted to adjustable table 87 which is mounted on the main table 31. A pin 89 is fixed in shank 67 so as to extend out therefrom on one side into an obliquely L-shaped cam groove 91, Figs. 15 and 16, formed in cam plate 93 fixed on bracket 81 by screws 95, and to extend out on the other side of the shank between the teeth of a fork 97 secured by means of its hub 99 and Woodruff key 101 on the ends of a shaft 103 journalled in bearings 104, 105, Figs. 14 and 19, on bracket 81.

Figure 17:
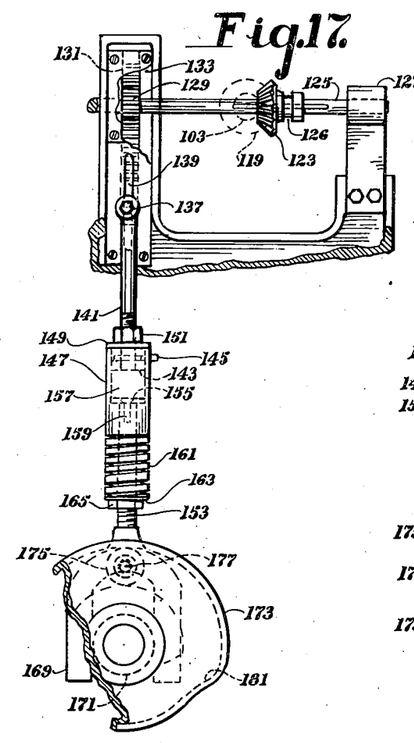
Figs. 17 and 18 are side and end elevations respectively of the yielding driving means for the end folder.
Figure 18:
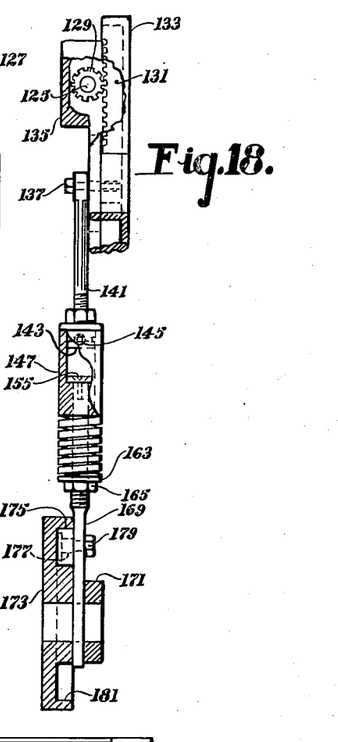

On the other side of bearing 104 a bevel gear 119 is secured to shaft 103 by pin 121. Bevel gear 119 is driven through an intermeshing bevel gear 123, Figs. 4, 17 and 19, splined to a rockshaft 125 extending the full length of the main table 31 and rotatably mounted in bearings 127 in connection with the side frame of the machine. The auxiliary table 87 is adjustable as in the known machine, thus providing for bodily shift of brackets 81 and 85 and thus of the end folding assembly. Adjustment of the position of bevel gear 123 on shaft 125 is thus necessary to provide for adjustment of the working position of the end folders 65 with respect to forms for different lengths of boxes; to provide this adjustment, and at the same time prevent getting the machine out of timing while adjusting, a fork 124 is mounted by screws 113 on bearing 104 to fit into groove 126, Fig. 17, in the hub of gear 123, and thus keep the two gears always in mesh. At midlength of shaft 125 is fixed a pinion 129, Figs. 4, 17 and 18, which is engaged by a rack 131 working in a guide 133 in connection with the machine side-frame, the pinion being enclosed in a recess in the cover-portion 135 of the rack guide. The rack is driven by a connection in the form of a stud 137 fixed in the rack and extending through a slot 139 in the cover, its outward end passing through an eye in the upper end of a connecting rod 141 which is threaded into a plug 143 that is secured by a set-screw 145 in the counterbored upper end of a cylinder 147, a jam nut 151 being applied to the connecting rod outside of the cylinder and bearing against the flanged upper end of the plug. Through the portion of cylinder 147 which is of smaller bore extends another rod 153 having a head 155 fixed thereto within the space 157 of the counterbore by means of a screw 159. A heavy expanding coil spring 161 surrounds the rod 153 and is confined between the lower end of cylinder 147 and a washer 163 adjustably positioned by a nut 165 on the threaded lower end of the rod, the construction making a compound connecting rod which drives the rack positively in pulling down thereon, but is yielding under an upward push to prevent breakage of parts during the working stroke of the end folder 65 inwardly and downwardly within the box in case of any substantial obstruction to its free movement. The lower end of rod 153 is integral with a U-shaped guide 169 which straddles the hub 171 of cam wheel 173, a cam roll 175 being mounted on a stud 177 fixed by nut 179 on the U-shaped guide 169 immediately below the lower terminus of rod 153 and traveling in a cam path 181 formed in one face of the cam wheel. Cam wheel 173 is fixed on the main shaft geared to the countershaft 185 to which power from any desired source is applied by pulley 187.

Figures 20, 21:
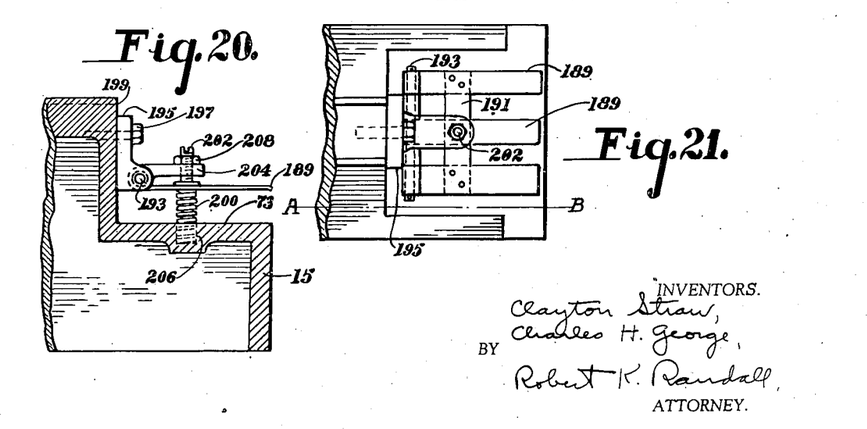
Figs. 20 and 21 are elevational and plan views respectively of the means for supporting the side-tabs against the inward thrust of the end folder in folding over the top edge of the end, Fig. 20 being a vertical section on line A—B of Fig. 21.

To compel the terminal portions 63 of the end of the box to fold along the line of the top edges of the tabs 59, in the manner indicated in Figs. 15 and 16, it is desirable to support the top edges of the tabs against the inwardly-directed force applied to the upstanding end portions 63 by the end folding members 65 at the commencement of their action. This is accomplished by means of a plurality of fingers 189, Figs. 15, 20 and 21, herein formed of sheet metal and connected by strap 191 to swing in unison about a horizontal pivot 193 fixed in a bracket 195 attached by screw 197 to the vertical wall 199 of the step formed in each end of the form 15. These fingers are yieldingly pressed upward by expanding coil springs 200 against an adjusting screw 202 threaded through an arm 204 integral with bracket 195, the lower end of the springs being received in sockets 206 in the form and the screw being retained in adjustment by lock nut 208. Being set to stand just flush with the top edges of tabs 59 after they have been turned in into a common plane, as shown in Fig. 15, these fingers brace the tabs rigidly, thus compelling the fold line between portions 61 and 63 to be defined in sharp and true manner at the predetermined creased line as the top edge of portion 63 is forced inward. The end supporting fingers 189 continue their support of the tabs until the end portion 63 has passed below the horizontal, the end folder 65 being recessed as indicated at 210, Figs. 14 and 16, and the fingers yielding under the pressure of the descending edge of portion 63 as the latter is brought into contact with the inward faces of the tabs.

Further to support the top edge of the end of the box as the folding-over of portion 63 is completed during the substantially vertical final movement of end-folder 65, a broad spring blade 212, Figs. 14–16, is applied to the under side of bracket 81 by screws 214 so that its free end which is toward the box will engage the outward surface of end portion 61 a short distance below the fold line to prevent the end of the box from being spread outwardly as the end-folding member 65 thrusts downwardly within the box. When the presser 69 is driven in, the spring 212 yields upwardly, having completed its function. The inside supporting fingers 189 cooperate with the spring blade 212 to hold the end of the box absolutely rigid during the turning-in of the top part 63 of the end. Spring 212 also holds the end of the box bent up until the presser 69 comes up, and further prevents a bulge as the extremity 63 is turned over.

Figure 22:
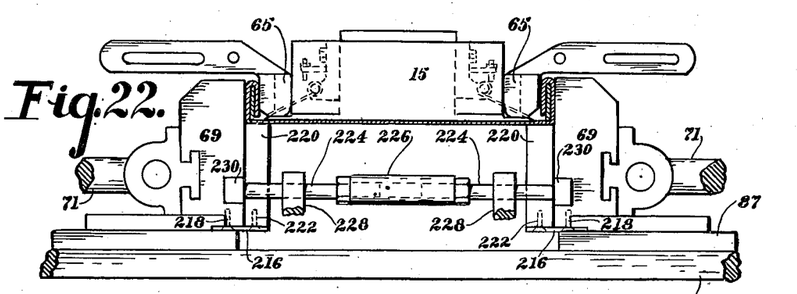
Fig. 22 shows the manner of employing the machine of the invention for making shallow boxes or covers.
Figure 23:
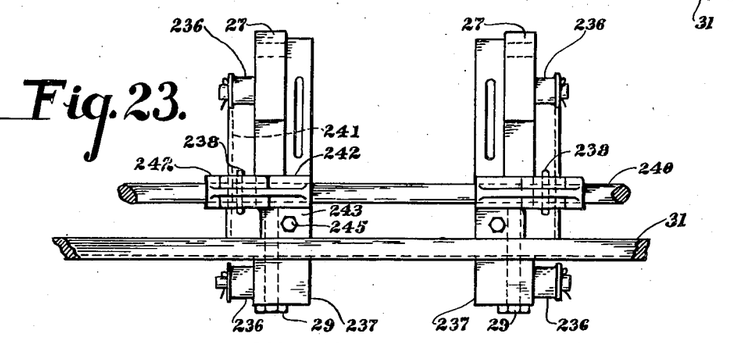
Fig. 23 is a detail of the side-folding stands and main table, showing the means for guiding and driving the taking-out chains.

To prevent the end-folder's action from forcing the box downward and spoiling the folding, a plate 216 retained by screws 218 is affixed to the bottom surface of presser 69, extending under the box and supporting it as the end-folder commences its action. It is withdrawn with the presser as the latter recedes after acting, leaving the chute open for discharge of the box. When boxes of less than the maximum height provided for by the machine are to be made, as when shallow covers are to be manufactured, stop means adjustable, or replaceable to afford the proper height, as blocks 220, Fig. 22, are attached by screws 222 to the supporting plates 216 extending inward from the working face of the pressers 69. Traveling back and forth with the pressers 69, the top surfaces of these blocks are brought under the ends of the shallower form 15 which is substituted, as the form approaches the end of its downward stroke, so that the blocks engage the bottom of the box and support the box in contact with the bottom of the form while the end-folders 65 perform their function. To compensate for the otherwise off-center load put on the pressers 69 in pressing the ends of a box cover with their top portions only, a spacer comprising two sections of rod 224 threaded into a sleeve 226 is mounted freely in bearings 228 in connection with the side-folding stands 27 but outside of the path of the box, to engage the working face of each presser 69 or lateral extensions 230 on the presser, the spacer being adjusted in length to take the thrust of the bottom portions of the two pressers 69 as the top portions thereof exert their pasting pressure on the turned-over ends of the cover. Obviously, this spacer is not needed in machines having provision for raising the center of pressure of the presser screw 71 with regard to its presser plate 69.

Figure 24:
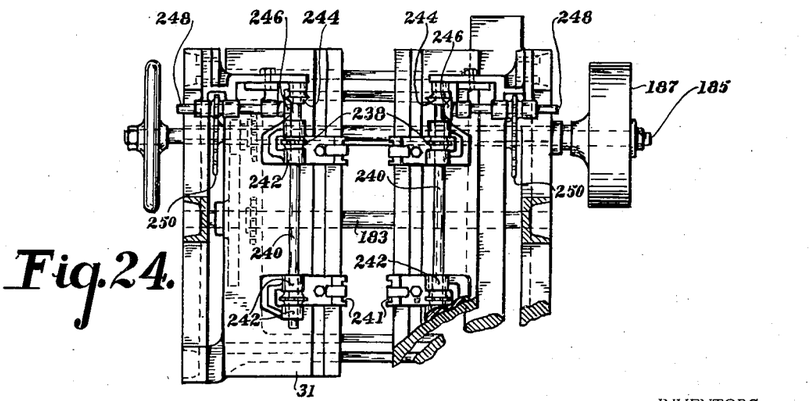
Fig. 24 is a plan view of the machine with the blank-folding means mainly removed, showing the drive for the mechanism for taking out the completed boxes.

Taking-out means are provided to insure each box being removed from the machine after its completion and before the following box can descend upon it. These means comprise chains 232, Figs. 5 and 6, equipped with fingers 234 which engage the top edges of the box after the form 15 has been withdrawn upwardly out of the box. The vertical run of each chain located alongside the sides of the box travels downwardly in groove 241 in the side-folding stands 27, so that the fingers 234 simultaneously engage the top edges of the two sides of the box at four points, carry the box downwardly in level relation, and drop it from the bottom of the machine as the chains change their direction at the bottom of their downward run. The successive boxes are expelled from the chute comprised by the side-folding stands 27 and extensions 237 and onto the carrier belt 247 at accurately timed spaced intervals, making possible the performance of subsequent mechanical operations on the box in wholly automatic manner. Each chain 232 is carried on three idlers 236 pivoted on the side-folding stands 27 at the top and on blocks 237 affixed to the under side of the main table 31 by cap screws 29, and driven by a sprocket 238 splined on a shaft 240 carried in bearings 242 mounted on the side-folding stands 27 by means of their angular extensions 243 and screws 245. Each shaft 240 is driven through bevel gears 244, 246, Fig. 24, from a separate jackshaft 248, which in turn is driven through a sprocket fixed thereto and a chain 250 from a sprocket 252 receiving motion through chain 254 from shaft 183. As is obvious, this taking-out mechanism is applicable to many various types of box making machines beside the one disclosed herein, as it is useful wherever boxes fail to feed or drop out of the machine with resultant jamming of the machine and spoilage of boxes, or where there is need to deliver the boxes in accurately timed relation, so as to synchronize the box machine with other mechanisms.

To change over the machine for a different size of box, the form 15 is replaced with another of the desired dimensions, an appropriate length of end-folder 65 is installed at each end on the shank 67 by the screws 66, a shorter or longer side-folder 19 is mounted on each shaft 25 and the side-folding stands and bevel gears 47 appropriately shifted, and the two end turning assemblies are shifted lengthwise by movement of table 87.

Referring to the timing of the various operations of the machine, the form is raised for 60° for feeding, then descends for 85°, during which period the folding of the sides and tabs and the turning-up of the ends is accomplished; the form rests at the bottom of its stroke for 130°, during which period the turning-in of the extremities 63 of the ends is effected, requiring about 43° of the machine's cycle. While the end-folder 65 is down within the box, the presser 69 presses the folded and pasted end against the form and the end-folder 65, resting in place for 60° while the pressure is applied to cause adherence of the paste, this latter operation being effected by the presser during about 50°. The remainder of the cycle is devoted to the retraction of the various operating elements. Variation of the speed of action of the tab-folders and end-folders can be obtained by changing the shape of the cam or the gear ratios.

While we have illustrated and described certain forms in which the invention may be embodied, we are aware that many modifications may be made therein by any person skilled in the art, without departing from the scope of the invention as expressed in the claims. Therefore, we do not wish to be limited to the particular forms shown, or to the details of construction thereof, but What we do claim is:—

1. In a box making machine, in combination, a reciprocating form, and devices to fold the sides of a box-blank from their initial position in the plane of the box-bottom against the exterior of such form, moving toward and from the path of travel of the form and actuated during such folding by engagement of a rigid portion thereon with the blank inwardly of the fold-line and beneath the form.

2. In a box making machine, in combination, a reciprocating form, and devices to fold the sides of a box-blank against the exterior of such form, swinging toward and from the path of travel of the form on axes transverse to such path, and thereby acting to bend the sides of the box-blank from their initial flat relation into right-angle relation with the portion of the blank forming the box-bottom, and having portions receiving pressure from the box-blank at points inwardly of the fold-line to actuate such devices throughout the major part of such folding action.

3. In a box making machine, in combination, a reciprocating form, and devices to fold the sides of a box-blank into upstanding relation with the bottom thereof against the exterior of such form, swinging toward and from the path of travel of the form on axes transverse to such path during such folding and having a portion engaged by the box-blank inwardly of the fold-line and while propelled by the form to impart sustained swinging movement to such devices.

4. In a box making machine, in combination, a reciprocating form, and means to fold the sides of a box-blank against the exterior of such form, comprising pivoted members each having a portion at one side of the pivot to be engaged by the blank at points a substantial distance inwardly of the fold-line while the plank is supported and forced past by the form, and a portion at the other side of such pivot, remaining always outside the path of travel of the form, to engage and fold up a side of the box-blank when swung about its pivot by such engagement, the side-folding means being so arranged as to avoid contact with the fold-line until the resistance of the sides to bending has been substantially reduced.

5. In a box making machine, in combination, a reciprocating form, and devices to fold the sides of a box-blank against the sides of such form, moving toward and from the path of travel of the form, and means for simultaneously bending the tabs on the ends of the sides of the box-blank out of the planes of such sides and toward the ends of the form, traveling in a curved path around the corners of the form toward and from the plane of the ends of the form.

6. In a box making machine, in combination, a reciprocating form, a support, a shaft transverse to the path of travel of the form, a plate fixed on such shaft to be struck and rocked by parts in connection with the form during the latter's travel, a pivot fixed transversely on such shaft, a tab-folding arm swinging on this pivot, and connections between such arm and the support causing the arm to swing on its pivot as the shaft is rocked by the plate.

7. In a box making machine, in combination, a reciprocating form, means to fold a side portion of a box-blank against the side of such form, and means to bend a tab at the end of the side portion, comprising an arm swinging about a swinging axis, and moving around the corner of the form toward and from the plane of the end of the form.

8. In a box making machine, in combination, a reciprocating rectangular form, means to fold a side portion of a box-blank against the side of such form, and means to bend a tab at the end of the side portion, comprising an arm swinging on an axis parallel to the plane of the end of the form and also parallel to the changing plane of the side portion as the latter is being folded up.

9. In a box making machine, in combination, a reciprocating rectangular form, means for folding up the side and end portions of a box-blank through a bending engagement with the four edges of the bottom of such form, means for turning in the tabs on the ends of the side portions, and devices for folding the extremities of the end portions over the tabs and into the box interior, comprising members apart from and normally located outside the path of travel of the form, and moving into such path and down within the folded-up box and on top of the form after the form bearing the latter has passed and while the said four edges occupy the four corners of the box thus formed around such edges.

10. In a box making machine, in combination, a reciprocating form having a bottom of fixed length equal to the length of the box to be made, and less in depth at its ends than the depth of such box, means for folding up the side and end portions of a box-blank around such form, including means for turning in the tabs on opposite side portions into a common plane, devices apart from the form normally positioned outside this plane of the end, and means for moving these devices inwardly beyond this plane and thence into the box and on top of the form, to fold the extremity of the end portion inwardly over the tabs.

11. In a box making machine, in combination, a reciprocating form, devices to fold the sides of a box-blank against the exterior of the form, and end-folders remaining stationary while the form carries the box-blank past them to fold the ends, and thereafter moving inwardly and down within the box and on top of the form to turn in the extremities of the ends while the bottom of the form occupies the angles between such ends and the bottom portions of the box.

12. In a box making machine, in combination, means for folding up the side and end portions of a box-blank into box form, means for folding the extremities of the end portions over parts of the sides, and means for supporting the parts thus forming the ends of the box adjacent the fold-lines of such extremities during the folding-over comprising yielding pressers displaced during the folding over of the said extremities.

13. In a box making machine, in combination, a reciprocating form, devices to fold the sides and ends of a box-blank against the exterior of the form, means for folding the extremities of the end portions over parts of the sides, and means for supporting the parts thus combined to form the ends of the box during the folding-over of the extremities comprising members pivotally mounted on the form and yieldably held in end-supporting position.

14. In a box making machine, in combination, a reciprocating form, devices to fold the sides and ends of a box-blank against the exterior of the form, means for folding the extremities of the end portions over parts of the sides, and means for supporting the parts thus combined to form the ends of the box during the folding over of the extremities comprising members having their box-engaging portions adapted to yield in the direction of movement of the form under impulsion of the means folding over the said extremities.

15. In a box making machine, in combination, means for folding up the side portions of a box-blank into box form, means for folding the extremity of at least one of such portions over parts of the sides, and actuating devices for the extremity-folding means acting in yielding manner to move the said means throughout a working stroke folding the said extremity down within the box, and acting in positive manner to retract the said means throughout an idle stroke.

16. In a box making machine, in combination, means for folding up the side portions of a box-blank into box form, means for pasting the box parts to retain such form, members defining a chute in which the box is located at the completion of the folding and pasting, and means positively expelling the thus completed boxes separately and out of contact with each other downwardly from the chute at accurately timed spaced intervals and after a predetermined duration of confinement of the sides within the chute.

17. In a box making machine, in combination, a reciprocating form, devices folding the side and end portions of a box-blank around the form into box shape as the form carries the blank between such devices, means for pasting the box parts to retain such form, members defining a chute in which the box is located at the completion of the folding and pasting, and endless chains adjacent the path of travel of the form having members traveling along such path engaging each box in succession and expelling it from the chute separately and out of contact with other boxes after a predetermined duration of confinement of the sides within the chute.

18. In a box-making machine, in combination, a reciprocating form, means to fold a side portion of a box-blank against the side of such form, and means to bend a tab at the end of the side portion, comprising a tab-engaging member swinging in a helical path.

19. In a box-making machine, in combination, a reciprocating form, means to fold a side portion of a box-blank against the side of such form, and means to bend an extension at the end of the side portion, comprising an extension-engaging member swinging in substantially the same path of movement as that of the extension in bending with respect to its said side portion.

20. In a box-making machine, in combination, a reciprocating rectangular form, means to fold a side portion of a box-blank against the side of such form, and means to bend a tab at the end of the side portion, comprising a tab-engaging member positively moved across the end of the form with a component of movement toward and from the plane of such end.

CLAYTON STRAW.
CHARLES H. GEORGE.